April 21, 1925.                    1,535,016
F. S. BARKS
JOURNAL BOX
Filed July 9, 1923
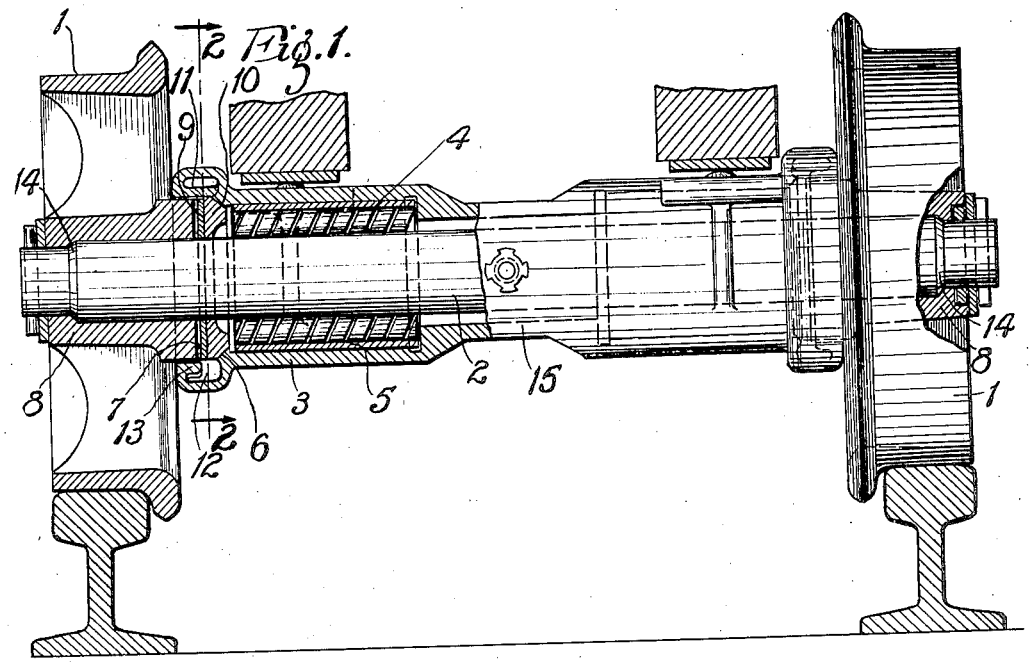
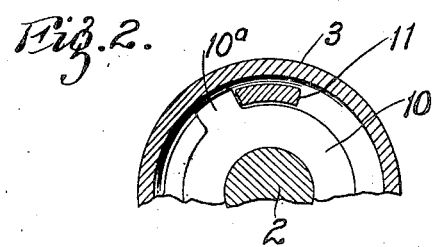
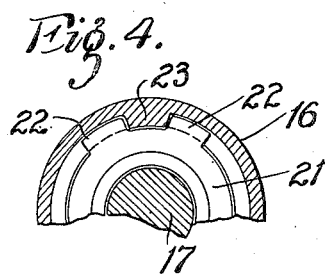
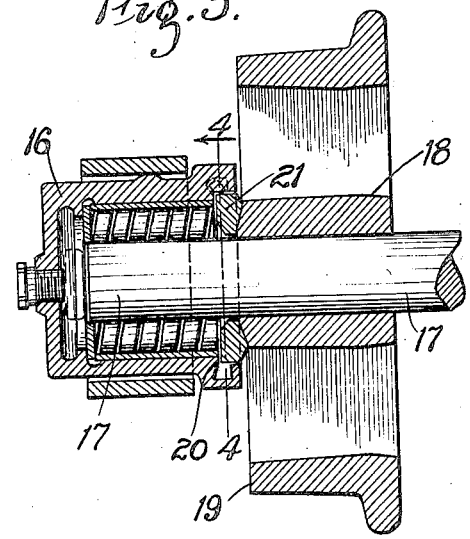
Inventor:
Frank S. Barks
By Cornwall, Bedell & Jarvis
Attorneys Patented Apr. 21, 1925.

1,535,016

UNITED STATES PATENT OFFICE.

FRANK S. BARKS, OF ST. LOUIS, MISSOURI, ASSIGNOR TO LINCOLN STEEL AND FORGE COMPANY, OF ST. LOUIS, MISSOURI, A CORPORATION OF MISSOURI.

JOURNAL BOX.

Application filed July 9, 1923. Serial No. 650,219.

*To all whom it may concern:*

Be it known that I, FRANK S. BARKS, a citizen of the United States, residing at St. Louis, Missouri, have invented a certain new and useful Improvement in Journal Boxes, of which the following is a full, clear, and exact description, such as will enable others skilled in the art to which it appertains to make and use the same, reference being had to the accompanying drawings, forming part of this application.

My invention relates to journals and journal boxes and is especially adapted for use on mine cars or the like and consists in an improved journal box, axle and wheel assembly.

The objects of my invention are to eliminate destructive wear by relatively rotating parts in the wheel, axle and journal box by the provision of a novel lubricating element and by controlling the relatively rotatable parts so that the least destructive relative movement will take place.

In the accompanying drawings which illustrate my invention,—

Figure 1 is a vertical section through a wheel and journal box assembly and embodying my invention.

Figure 2 is a fragmentary vertical section taken on the line 2—2 of Figure 1.

Figure 3 is a section similar to Figure 1 but showing a modified construction.

Figure 4 is a fragmentary vertical section taken on line 4—4 of Figure 3.

Figure 5 is a section corresponding to Figures 2 and 4 but illustrating a modified construction.

The wheels 1 are mounted upon an axle 2 and may either be fixed upon the axle to rotate therewith or may be freely mounted thereon, both arrangements being common practice in this type of cars. Each journal box 3 is carried upon the axle by means of rollers 4 which are to be retained in the space between the axle and a sleeve 5 preferably made of hardened steel and fitting the interior of the journal box.

Each journal box has an outwardly facing surface 6 which is opposed to the inwardly facing surface 7 on the wheel hub 8. Since the contact of the large area of the hub and the relatively thin edge 6 of the journal box, if the two were abutting, would result in the rapid cutting of the hub surface 7 by the edge of the box, it is necessary to provide a bearing element for the hub and such provision is indicated by the washers 9 and 10. If these washers were free to rotate relatively to the journal box, it is obvious that washer 10 would be subjected to destructive wear and to prevent this rotation, I provide the washer with a lug 10ª and on some portion of the journal box 3 surrounding the washer I provide a stop 11 for the washer lug 10ª so that the rotation of the washer relative to the journal box is limited.

In Figure 1 the outer portion of the journal box is provided with a lubricant reservoir which opens to the wheel hub and is partially closed by the edges of washers 9 and 10. One wall of this reservoir is formed by an inwardly turned flange 13 which is spaced from the body of the journal box except at the restricted point where it extends across to and unites with the journal box to form the stop 11.

With this construction, washer 10 can only rotate approximately three hundred sixty degrees and will then be held against rotation by the journal box so that any further wear between relative rotating parts will be distributed over the broad opposing surfaces of the hub and washers and the wearing effect of the edge contact of surface 6 and washer 9 will be eliminated.

When the car is moved in the opposite direction the lug 10ª on washer 10 will move downwardly through the lubricant in the reservoir 12 and raise some lubricant to a point above the axle from where it will flow by gravity down over the surfaces to be lubricated.

If the axle 2 rotates, it is desirable to prevent friction between the axle and the washer as the latter is thin and likely either to cut the axle or to be worn thereby. To eliminate this objection the opposing faces of the washer and box are made frusto-conical or dished in shape. This arrangement of these two parts serves to center the washer on the axle so that no face of the washer will be thrust against the axle because of the pressure between the washer lug and the journal box stop 10ª, or otherwise.

The construction illustrated also provides for the forcing of lubricant to the bearing surfaces by the shifting to and fro of the wheels across the journal boxes. The axle 2 is shouldered at 14 and wheels 1 have their hub interiors shouldered to fit against axle shoulders 14. These interengaging shoulders limit the approach of the wheels toward each other and I make the distance between shoulders 14 on the axle long enough so that both wheels may not press against the edges 6 of their respective journal boxes simultaneously, in other words, the axle and wheels may shift across the car relatively to the latter. Each shifting draws one wheel away from its washers or separates the latter and thereby draws in between them a little lubricant from the reservoir 12. At the same time, the movement of the other wheel toward the journal box forces part of the lubricant between the washers and that wheel and the adjacent journal box into the crevices between the surfaces to be lubricated. This movement repeated whenever the car strikes a curve or, in fact, any lateral unevenness in the rails, provides a pumping action highly efficient in forcing lubricant between rollers 4, between the axle and hub, between washers 9 and 10, the hub and journal box, and between the axle and hub, especially if the wheels are rotatable on the axle, in which case the shoulders are useful in checking the flow of lubricant along the axle so that most of the lubricant is directed to the other bearing surfaces.

In Figure 1 the journal boxes are shown as being formed integrally with a connecting barrel 15 whereby the axle from wheel to wheel is enclosed. Obviously, the journal boxes could be separately formed and held in fixed relation to each other by the car framing and in such construction any ordinary packing, such as illustrated in my copending application Serial #553,950, would be provided at the rear of the journal box to prevent loss of lubricant.

In the modification shown in Figure 3 the journal box 16 is mounted on the end of the axle 17 and outside of the hub 18 of the wheel 19. In this construction the restricted edge 20 is prevented from contacting with the face of the wheel hub 18 by means of a washer 21 which corresponds to washer 10 in Figures 1 and 2. This washer is shown as having two lugs 22 contacting with opposite sides of a lug 28 on journal box 13. This construction will prevent any rotation of the washer in either direction and of course the distance between lugs 22 may be increased to permit a limited rotation of any desired amount less than three hundred sixty degrees. In this modification the dished surfaces are on the front of hub 18 and on the rear of washer 21.

Another modification is shown in Figure 5 in which the washer 24 has a single projecting lug 25 and the journal box 26 is provided with spaced lug engaging bosses 27 which may be so close together as to prevent any rotation of the washer or may be spaced apart to permit a limited rotation of the washer.

I contemplate the usual modifications in the details of construction of my invention as will suggest themselves to those familiar with the art without departure from the spirit of my invention as expressed in the appended claims.

I claim:

1. In combination, a journal box, a wheel, a bearing element having an annular wheel thrust-receiving surface, a thrust-washer between said surface and said wheel and rotatable by said wheel to a limited extent only.

2. In combination, a journal box having a wheel thrust receiving surface of restricted area, a thrust washer to be placed between said surface and a wheel, and means for limiting the movement of said washer over said surface but permitting some movement of said washer over said surface.

3. In a journal box, an annular wheel thrust receiving face, a lubricant well adjacent the lower outer portion of said face, a washer to be placed between said face and a wheel and provided with a projection adapted to extend into said well, and means for preventing rotary movement of said projection past the upper portion of said face while permitting rotary movement of said projection below said portion.

4. In a journal box, an annular wheel thrust receiving face, a lubricant well adjacent the lower outer portion of said face, a washer to be placed between said face and a wheel and provided with a projection adapted to extend into said well, and means for preventing movement of said projection past any predetermined point on said face while permitting movement of said projection substantially around said face in either direction up to said point.

5. In a journal box, an annular wheel thrust receiving face, a lubricant well adjacent the outer portion of said face, a washer to be placed between said face and a wheel and provided with a projection adapted to extend into said well, and means for preventing movement of said projection past any predetermined portion of said sleeve, said means comprising a journal box element adapted to engage said projection.

6. In a journal box, an annular wheel thrust receiving face, an annular lubricant receiving recess adjacent to and surrounding said face, and a thrust washer adapted to engage said face to project into said recess and, when rotated, to distribute lubricant therein to different portions of said recess and means limiting such rotation to less than three hundred sixty degrees.

7. In a journal box, a body, a cylindrical bearing element formed on said body, a thrust washer contacting with said element, an annular rim on said body having a recess surrounding the edge of said washer and having a return flange adapted to surround the periphery of a wheel hub and terminating throughout the major portion of its length short of said washer but having a restricted section extending across said recess.

8. In combination, an axle, a wheel hub mounted thereon, a journal box, said wheel hub and journal box having opposing faces, a washer rigid between said faces, engaging the same and surrounding said axle, the engaging surfaces of said washer and box face being dished to separate the washer from the axle.

9. In a journal box, a rotating axle, a rigid thrust bearing washer surrounding said axle and held against rotation, a wheel hub having a face disposed at an angle to the hub axis and engaging said washer, said journal box and washer engagement serving to space the inner annular periphery of said washer from said axle.

10. In combination, a journal box having a lubricant reservoir, a rotating axle journaled in said box, a wheel having a hub projecting into said journal box, there being a restricted annular passage between said wheel hub and said journal box communicating with said reservoir, said wheel having a slight movement longitudinally of said journal box whereby lubricant is forced into said passage to prevent the admission of dirt, etc.

11. In combination, a journal box having a lubricant reservoir provided with an outlet, an axle journaled in said box, a wheel on said axle having a hub which projects into said journal box with its rear face perpendicular to its axis and terminating adjacent to the outlet from said reservoir, said wheel having a slight movement longitudinaly of said journal box and adapted by such movement to force lubricant discharged through said outlet to the contacting surfaces of said axle and journal box and of said journal box and wheel.

12. In combination, a journal box having a lubricant reservoir provided with an outlet, an axle journaled in said box and shouldered near its end, a wheel rotatable on said axle having a hub, the interior of which is shouldered to correspond with said axle shoulder and which hub projects into said journal box with its rear face terminating adjacent to an outlet in said reservoir, said axle having a slight movement longitudinally of said journal box whereby transverse movement of said axle in said box will move said wheel so as to force lubricant discharged through said outlet to the bearing surfaces of said axle, journal box and wheel.

13. In combination, spaced journal boxes having lubricant reservoirs, an axle extending through said boxes, wheels mounted on opposite ends of said axle and each provided with a vertical bearing surface opposing a similar box surface, and passages between said reservoirs and said surfaces, said mounting being such that all of said bearing surfaces may not contact simultaneously.

14. In combination, spaced journal boxes having lubricant reservoirs, an axle extending through said boxes and shouldered near its ends, wheels having their hub interiors shouldered to fit said axle shoulders and thereby held against inward movement on said axle, vertical surfaces on each wheel and its respective box cooperating to provide a transverse bearing, said box surfaces being spaced apart a less distance than said wheel surfaces, and passages between said reservoir and said surfaces.

In testimony whereof I hereunto affix my signature this 22nd day of June, 1923.

FRANK S. BARKS.